This invention relates to gravity meters such as, for example, are used for purposes of geophysical exploration. More particularly, this invention pertains to a remotely controlled clamping device for use on gravity meters of this type. The present invention provides for an improvement in the vibrating-string gravity meter of the type described in U.S. Patent No. 2,657,581, of C. H. Fay et al., issued November 3, 1953, and of the clamp for such a gravity meter shown in United States Patent No. 2,953,023, issued September 20, 1960, to Richard R. Goodell.

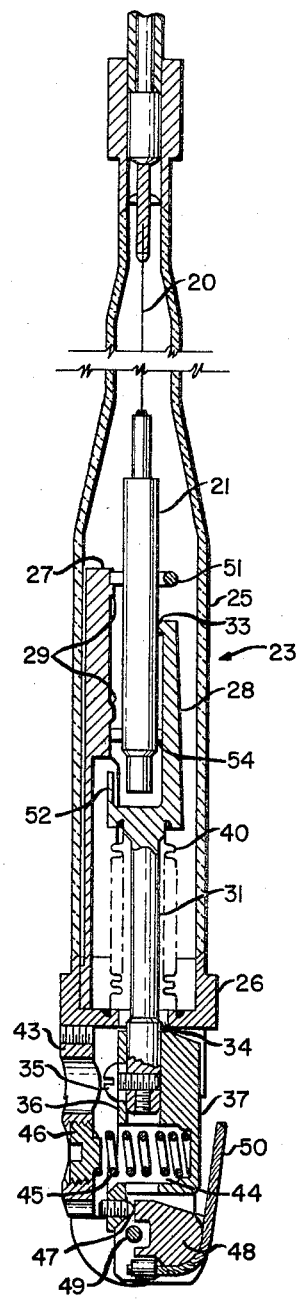
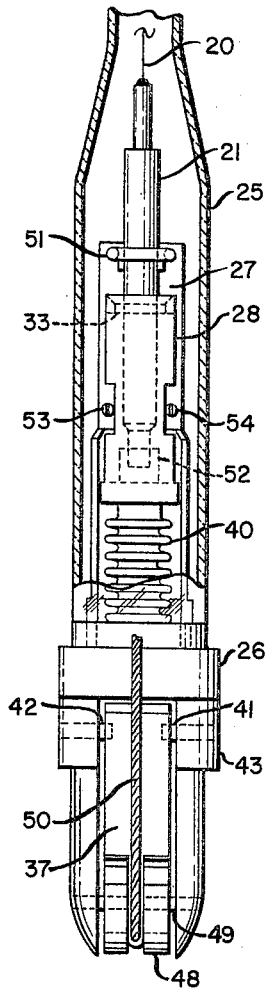
FIG. 1
FIG. 2
INVENTORS:
RICHARD R. GOODELL
JAMES C. ADAIR
BY:
THEIR ATTORNEY 3,264,875
GRAVITY METER CLAMP
Richard R. Goodell and James C. Adair, Houston, Tex., assignors to Shell Oil Company, New York, N.Y., a corporation of Delaware
Filed Mar. 11, 1964, Ser. No. 351,054
11 Claims. (Cl. 73—382)

Since the frequency of transverse vibrations of a string of a given length is proportional to the square root of the tension force applied thereto, gravitational forces can be measured by suspending a mass on a string and determining the tension force exerted by the mass on the string in a given gravitational field by accurately measuring the natural frequency of vibration of the system by the apparatus shown in the aforementioned United States patent to Fay et al. The main components of the apparatus are a mass and a string or filament upon which it is suspended. In order to reduce the air damping of the vibrations of the string, the string and mass are mounted within an evacuated chamber. The mass is vertically suspended so that the undisturbed pull of gravity on the mass is substantially the only tension force applied to the string.

From experience it has been found that while gravity meters of this type are capable of producing valuable information, they are susceptible to changes caused by a wide variety of instrument movements which are difficult to avoid during surveying operations. Since any change in the characteristics of the physical components of a gravity meter will result in instrument errors and hence errors in the data obtained from the instrument, it is essential that the effect of instrument movements resulting in changes in the physical components of the gravity meter be eliminated or at least reduced to such a minimum value that their effect is negligible.

The largest single change caused by movement of the gravity meter is the damage caused to the string suspending the mass by abnormal movement of the mass. When a gravity meter is placed in an upright position, so that the mass is vertically suspended, the full weight of the mass acts upon the string. In order to maintain the maximum sensitivity, the string provided is of the minimum diameter required to provide a support for the mass without exceeding the elastic limits of the material from which the string is made. In practice, it is impossible to avoid subjecting the string holding the suspended mass to vertical and rotational forces greater than normal when the gravity meter is moved to a measuring location, such as, for example, the interior of a well borehole. Even though the major portion of such forces are absorbed by shock-absorbing mountings supporting the evacuated chamber that contains this suspended mass, the forces applied to the string are often sufficient to alter the measuring characteristics of the instrument.

It has been found that the forces applied to the string during movement of the gravity meter may be eliminated by clamping the weight in place during such movements by a remotely controlled gripping or clamping arrangement and then releasing the vertically suspended mass when gravity measurements are to be made. Such a clamping arrangement is shown in the aforementioned United States patent to Goodell, wherein the movable mass, when not in use, is maintained in a stationary position by means of two movable spring-type jaws which are spread apart when the instrument is to be used. Although this clamping arrangement operates satisfactorily to remove the strain on the string, it presents various other operating problems which affect its usefulness. Basically, these problems are the results of the environment in which the clamping arrangement and the mass are located, i.e., in a vacuum, and the high temperature required to produce the desired vacuum.

To obtain a stable ultra-high vacuum, all materials with an appreciable vapor pressure, which includes most lubricating materials, must be eliminated. There is of course an unavoidable contamination of such high vapor-pressure components, such as adsorbed water vapor, air, and organic constituents; they can only be removed during the final evacuation by a prolonged baking at as high a temperature as practicable, say 12 hours or more at 800° F. This procedure will partially anneal and stress-relieve many metal alloys ordinarily used in a prestressed state as springs. If further results in surfaces so "clean" that contact of two materials can result in bonding ordinarily referred to as "welding"; where sliding motion also occurs, the welding process results in the phenomenon referred to as "galling."

With a clamping arrangement as shown in the aforementioned Goodell patent, the biggest problem resulting due to the environment and the evacuation procedure is the relatively strong bonds formed by the metal to metal contact between the movable jaws and the movable mass. Because of these strong bonds, oftentimes when the clamping arrangement is released, the mass does not separate from one of the clamping jaws and consequently the instrument cannot be used for measurements. Furthermore, the ineffective or lack of lubrication between the movable parts in the evacuated chamber results in excessive wear of the parts and thereby increased maintenance for the instrument.

It is therefore the primary object of the present invention to provide an improved remotely controlled means for gripping and releasing a gravity meter mass which is vertically suspended within an evacuated chamber.

It is another object of this invention to provide a remotely controlled clamping arrangement for gripping and releasing a mass which is vertically suspended within an evacuated chamber, which clamping arrangement provides for positive separation between the mass and the gripping means upon release.

Another object of this invention is to provide a remotely controlled clamping arrangement for gripping and releasing a mass which is vertically suspended in an evacuated chamber, which clamping arrangement contains no parts requiring lubrication or prestressing such as springs within the evacuated chamber.

A further object of this invention is to provide a remotely controlled clamping arrangement for gripping and releasing a mass which is vertically suspended within an evacuated chamber, which clamping arrangement provides for positive separation between the mass and the gripping means upon release and which contains no parts requiring lubrication or prestressing such as springs within the evacuated chamber.

It is still a further object of the present invention to provide remotely controlled means for gripping and releasing a vertically suspended mass of a gravity meter, which gripping means does not itself impart damaging stresses to the delicate mass suspending string of the meter.

Briefly, the above objects are achieved by providing a clamping arrangement for the mass consisting of one movable and one immovable or stationary clamping member. The immovable clamping member is entirely within the evacuated chamber and is provided with a mechanical stop which limits the lateral movement of the mass away from the immovable clamping member should it remain in contact with the movable clamping member once the clamping arrangement is released, and thereby breaking the metal bond between the mass and the movable clamping member. The movable clamping member, on the other hand, is provided with an extension which initiates lateral movement of the mass away from the immovable contact member should it remain in contact with the immovable member once the clamping arrangement is released. The control mechanism for the movable member, and thereby all of the parts requiring lubrication or prestressing, are connected to the movable clamping member outside of the evacuated chamber after the evacuation process.

The above objects and advantages of the invention will be more clearly understood from the following description when taken in conjunction with the accompanying drawings, wherein:

FIGURE 1 is a vertical sectional view, partially in elevation of the clamping means according to the invention positioned adjacent the suspended weight of a gravity meter; and, FIGURE 2 is a side view, partially in section, of parts of FIGURE 1.

Referring now to drawings, the present weight clamping means is shown mounted on the bottom of a gravity meter similar to the one described in the U.S. patent to Fay et al. The lower portion of the gravity meter is shown as containing a filament or wire 20, forming the string and having a small cross section and a very small coefficient of thermal expansion. To the lower end of the string is connected a mass or weight 21, which is, for example, of the order of five grams. The suspended mass system is enclosed in a housing 23 such as an elongated tube or cylinder which is evacuated to a high degree of vacuum to decrease the damping of the wire 20 by air friction. The housing 23 preferably consists of an upper glass portion 25 which is sealed in a pressure-tight manner to a lower metal portion 26, to which additional elements can be conveniently joined to become a part of the instrument. It should be noted, however, that the evacuated housing 23 can be constructed of any material having suitable properties of electrical conductivity while at the same time being impermeable to gas and adapted to form a gastight union with other materials.

In order to prevent movement of the mass or weight 21 until it is desired to take measurement, a mass clamping arrangement is provided which comprises two mass-gripping members 27 and 28, preferably metal, which are positioned within the housing 23 at the level of the mass or weight 21 and on opposite sides thereof.

The gripping member 27, which is stationary and forms an abutment against which the mass is clamped, is mounted entirely within the housing 23 and consists of a plate having its lower end fixedly secured to the inner surface of the lower metal portion 26 of the housing 23 and extending upwardly adjacently to the wall of the housing 23. The gripping member 27 is provided with a plurality of inwardly directed contact points 29 opposite the mass 21. Although these contact points are shown as having its lower end fixedly secured to the inner surface stood that these contacts may have other shapes, e.g., as knife edges, which provide a secure clamp for the weight 21 without damaging the weight.

The movable gripping member 28 is fixed to a rod 31 which is mounted coaxially with the mass 21; it may have the form of a plate and extends along one side of the mass 21. The upper end of the gripping member 28 is provided with an inwardly directed contact point 33 which contacts the mass 21 at a point along its length intermediate the contact points 29, preferably opposite the center of gravity of the mass 21. As with the contact points 29 of the member 27, the contact point 33 should be of such dimensions as to produce a secure clamp for the weight 21 without damaging the weight. The lower end of the rod 31 passes through an opening 34 in the bottom of the housing 23 and is fixedly secured, for example, by means of screw 35 and set screw 36, in a support plate 37. In order to maintain the vacuum within the housing 23 while at the same time allowing movement of the member 28, resilient means must be provided for sealing the opening 34. Preferably this sealing means comprises a metallic bellows 40 which forms a movable sealing means about the rod 31. Sealing may then be accomplished by use of gastight brazed unions between the lower ends of the bellows 40 and the lower metal portion 26 of housing 23, and between the upper ends of bellows 40 and the rod 31.

As best shown in FIGURE 2, the support plate 37 is mounted on a pair of pivot pins 41, 42 which are journaled in a U-shaped base 43 rigidly connected to the bottom of housing 23. With this construction, movement of the plate 37 in the counter clockwise direction in FIGURE 1 causes the contact point 33 of gripping member 28 to contact the mass 21 and move it laterally against the contact points 29 of gripping member 27, thereby securing the mass in place until a measurement is desired. To insure that the mass is gripped between the members 27 and 28 until such time as a measurement is desired, the plate 37 is preferably provided with a recess 44 containing a spring 45 which has one end bearing against the end of the recess 44 and its other end bearing against a plug 46 threadedly fastened into the bottom portion of the base 43. The plug 46 is threaded into the base a distance sufficient to compress the spring 45 and thus cause the spring 45 to urge the plate 37 counter clockwise and clamp the mass 21 between the members 27 and 28. It should be noted, however, that the degree of compression imparted to the spring 45 should be just sufficient to provide as light a contact between the contact points 29 and 33 with the mass 21 as will securely fasten the mass 21 against movement, in order that the bonds formed between the clamping members and the mass be as weak as possible.

As pointed out above, in its normal condition, the spring 45 urges the gripping member 28 against the mass 21 and the gripping member 27 to secure the mass in place. In order to actuate the gripping member 28 to release the mass 21 for the taking of measurements, the plate 37 is provided with a screw 47 at its bottom to form a contact point. As can be seen from the figures, movement of this contact point to the left in FIGURE 1 causes the member 37 to pivot clockwise about pivot pins 41 and 42; thereby the contact 33 is moved to the right and releases the mass for the taking of measurements. In order to provide the force necessary to move the contact point at the screw 47, a remotely controlled driving means is mounted outside of the evacuated housing 23. In the arrangement shown, this driving means comprises a cam member 48 mounted to pivot about a pivot pin 49 journaled at its two ends in the side walls of base 43, and a cable 50 secured to the lower end of the cam member 48. The upper end of cable 50 leads to any suitable reversible coil reeling mechanism (not shown) which is mounted in a convenient location outside the evacuated system of the gravity meter but preferably within the entire casing (also not shown) of the gravity meter.

Although the above-described clamping mechanism will securely clamp the mass 21 against movement and provides a clamping arrangement whereby all pivot points and other points requiring lubrication and all pre-stressed members are outside of the evacuated chamber, as pointed out above, due to the relatively strong bonds formed between metals in a vacuum, it is possible that when the gripping means are released, the bonds between the mass 21 and the gripping members 27 or 28 will not be broken, causing the instrument to produce inaccurate measurements. In order to insure the breaking of any bonds between the members 27 and 28 and the mass 21, a plurality of ejecting or bond-breaking means are provided. The first of these ejecting means is provided to break any bond between the gripping member 28 and the mass 21 and consists of an inwardly directed rigid loop of wire 51 connected at its two ends to the inner surface of the member 27 near the top thereof and surrounding the mass 21. The opening in the loop of wire 51 is such that when the mass is hanging freely in a vertical plane, i.e., when measurements are being taken, the mass 21 is not in contact with the wire 57. The second ejecting means, which is provided to break any bonds between the mass 21 and the gripping member 27 comprises an ejector formed as an upwardly extending lip 52 mounted on the member 28 just above the rod 31 and extending along the bottom portion of the mass 21 on the side adjacent the gripping member 27.

In operation, when it is desired to release the gripping means, the member 28 is pivoted away from the member 27 by means of cam 48 and cable 50. Should the bond formed between the contact point 33 and the mass 21 be greater than that formed between the mass 21 and the contact point 29, then as the gripping member 28 moves away from the member 27 with the member 28. This contact with the contact point 33 and continues to move away from the member 27 with the member 28. The lateral movement of mass 21 continues until the mass contacts the inner surface of the wire 51 at which time lateral movement of the mass 21 ceases while that of member 28 continues until the bond is broken and the mass hangs freely. Since the strength of any bond in a vacuum is the function of both pressure and time and because of the point contact between the ejecting member 51 and the mass 21 cause by the circular surface of the ejector 51, no metal bond sufficient to hold the mass 21 will be formed between the ejector 51 and the mass 21. Should the bond between the contact points 29 and the mass 21 be stronger than that between the contact point 33 and the mass 21, then as the member 28 moves away from the member 7, the mass 21 will initially remain against the member 27. However, after the member 28 has moved laterally a sufficient distance, the ejector 52 contacts the bottom portion of the mass 21 causing it to pivot about the contact points 29 and thereby break the bond therebetween. As with the ejecting means 51, the relatively short time that the ejecting lip 52 contacts the mass 21 and because of the constant movement therebetween no bond is formed between the ejecting lip 52 and the mass 21. With these two ejecting means, it can easily be seen that a positive release of the mass from the gripping member is effected.

It should be noted that when the gravity measurements are to be taken, it is essential that the mass be freely suspended in a vertical plane. To insure that the mass 21 is suspended vertically on the wire 20 during gravity measurements and free from any other mechanical contacts, the evacuated housing 23 with the above-described clamping mechanism is itself suspended vertically within a protective case (not shown) by an appropriate means as, for example, a gimbals system. This vertical suspension of the vacuum chamber assembly maintains the clamp assembly near the measure or free position of the mass 21, thereby reducing the required size of the clamp and overall assembly. It should further be noted that, during gravity measurements with the mass 21 unclamped, the lateral freedom of the mass is bounded or limited, as shown in FIGURE 1, on the left, by the inside surface of the ejector 52 on the movable gripping member 28 and on the right, by the wire loop 51 on the fixed gripping member 27. Referring to FIGURE 2, the lateral freedom of the mass 21 is limited by the wire loop 51 and a pair of wire posts 53 and 54 rigidly fixed to the fixed gripping member 27. This limiting of the freedom of motion of the mass 21 prevents any large lateral movements which would tend to damage the string 20.

Obviously, various modifications of the present invention are possible in view of the above teachings. For example, it is possible to use the disclosed clamping arrangement for clamping a mass suspended in an evacuated chamber which is used in an apparatus other than a gravity meter. It is therefore to be understood that the invention is not limited to the particular form illustrated but is capable of embodimen in other forms without departing from the spirit and scope of the appended claims.

We claim as our invention:
1. A gravity meter comprising:
 (a) a string having a mass suspended thereon;
 (b) a housing forming an evacuated chamber about said suspended mass;
 (c) a pair of mass-gripping means positioned within said housing and respectively on opposite sides of said mass, a first of said mass-gripping means forming an abutment and being mounted adjacent the side wall of said housing, a part of the second of said mass-gripping means passing out of said housing in sealed relationship and being movably mounted relative to said housing;
 (d) means mounted outside of said housing for normally urging an external part of said second mass-gripping means to move said second mass-gripping means substantially horizontally toward said mass and said first mass-gripping means to grip said mass and prevent any movement thereof; and,
 (e) a remotely controlled actuating means mounted outside of said housing and operatively connected to said second mass-gripping means for moving said second mass-gripping means away from said first mass-gripping means to release the mass.
2. The apparatus of claim 1 including:
 a pair of inwardly directed vertically spaced contact points provided on the inner surface of said first mass-gripping means; and,
 a single inwardly directed contact point mounted on the inner surface of said second mass-gripping means, said single contact point contacting said mass intermediate said pair of contact points substantially opposite the center of gravity of said mass.
3. The apparatus of claim 2 including means actuated by the movement of said second mass-gripping means away from said first mass-gripping means for positively ejecting the mass out of contact with said pair of mass-gripping means to break any bonds existing therebetween.
4. The apparatus of claim 3 wherein said means for ejecting said mass out of contact with said second mass-gripping means comprises: means for limiting the horizontal travel of said mass away from said first mass-gripping means.
5. The apparatus of claim 4 wherein said means for limiting the horizontal travel of said mass comprises: a rigid length of wire surrounding said mass and having its two ends fixedly secured to the inner surface of said first mass-gripping means at the upper end thereof.
6. The apparatus of claim 3 wherein said means for ejecting said mass out of contact with said first mass-gripping means comprises: an upwardly extending lip mounted on said second mass-gripping means, said lip extending along a portion of the length of said mass near the lower end thereof and on the side of said mass adjacent said first mass-gripping means, said lip normally contacting said mass at a point below said pair of contact points only when said second mass-gripping means is moved away from said mass and said mass remains in contact with said first mass-gripping means.
7. The apparatus of claim 5 wherein said means for ejecting said mass out of contact with said first mass-grip- ping means comprises: an upwardly extending lip mounted on said second mass-gripping means, said lip extending along a portion of the length of said mass near the lower end thereof and on the side of said mass adjacent said first mass-gripping means, said lip normally contacting said mass at a point below said pair of contact points only when said second mass-gripping means is moved away from said mass and said mass remains in contact with said first mass-gripping means.

8. The apparatus of claim 7 wherein said means for normally urging said second mass-gripping means toward said mass comprises a spring; and, wherein said remotely controlled actuating means comprises: cam means pivotally mounted outside of said cylinder in operative relationship with an external part of said second mass-gripping means; and, a cable secured at one end to said cam means for pivoting said cam means against said last mentioned contact point when tension is applied to said cable, the other end of said cable leading to said remote location.

9. A gravity meter comprising:
(a) a string having a mass suspended thereon;
(b) a cylinder forming an evacuated chamber about said suspended mass;
(c) resilient sealing means closing the lower end of said cylinder in a gastight manner;
(d) a pair of mass-gripping means positioned within said cylinder and respectively on opposite sides of said mass, a first of said mass-gripping means being stationary and mounted adjacent the side wall of said housing, the lower end of the second of said mass-gripping means passing through said resilient sealing means and being pivotally mounted outside of said cylinder;
(e) means mounted outside of said cylinder for normally pivoting said second mass-gripping means to move the upper end of said second mass-gripping means substantially horizontally toward said mass and said stationary first mass-gripping means to grip said mass and prevent any movement thereof; and,
(f) a remotely controlled actuating means mounted outside of said cylinder and operatively connected to the lower end of said second mass-gripping means for pivoting said second mass-gripping means to move the upper end thereof away from said first stationary mass-gripping means to release the mass.

10. The apparatus of claim 9 including means actuated by the movement of said second mass-gripping means away from said first mass-gripping means for positively ejecting the mass out of contact with said pair of mass-gripping means to break any bonds existing therebetween.

11. A clamping arrangement for a mass suspended from a string within an evacuated housing comprising:
(a) a pair of mass-gripping means positioned within said housing and respectively on opposite sides of said mass, a first of said mass-gripping means forming an abutment and being mounted adjacent the side wall of said housing, a part of the second of said mass-gripping means passing out of said housing in sealed relationship and being movably mounted relative to said housing;
(b) means mounted outside of said housing for normally urging an external part of said second mass-gripping means to move said second mass-gripping means substantially horizontally toward said mass and said first mass-gripping means to grip said mass and prevent any movement thereof; and,
(c) a remotely controlled actuating means mounted outside of said housing and operatively connected to said second mass-gripping means for moving said second mass-gripping means away from said first mass-gripping means to release the mass.

References Cited by the Examiner
UNITED STATES PATENTS

| | | | |
|---|---|---|---|
| 2,560,366 | 7/1951 | Owen | 73—382 |
| 2,953,023 | 9/1960 | Goodell | 73—382 |

RICHARD C. QUEISSER, *Primary Examiner.*